(12) United States Patent
Gu et al.

(10) Patent No.: US 9,205,512 B2
(45) Date of Patent: Dec. 8, 2015

(54) LASER BEAM WELDING

(75) Inventors: Hongping Gu, Waterloo (CA); Guobin Yin, Richmond Hill (CA); Boris Shulkin, West Bloomfield, MI (US)

(73) Assignee: MAGNA INTERNATIONAL INC., Aurora (CA)

( * ) Notice: Subject to any disclaimer, the term of this patent is extended or adjusted under 35 U.S.C. 154(b) by 366 days.

(21) Appl. No.: 13/993,244

(22) PCT Filed: Dec. 19, 2011

(86) PCT No.: PCT/CA2011/001390
§ 371 (c)(1),
(2), (4) Date: Jun. 11, 2013

(87) PCT Pub. No.: WO2012/079163
PCT Pub. Date: Jun. 21, 2012

(65) Prior Publication Data
US 2013/0270233 A1    Oct. 17, 2013

Related U.S. Application Data

(60) Provisional application No. 61/424,327, filed on Dec. 17, 2010.

(51) Int. Cl.
*B23K 26/20*    (2014.01)
*B23K 26/32*    (2014.01)
(Continued)

(52) U.S. Cl.
CPC .............. *B23K 26/203* (2013.01); *B23K 26/20* (2013.01); *B23K 26/28* (2013.01); *B23K 26/32* (2013.01); *B23K 26/3206* (2013.01); *B23K 26/3286* (2013.01); *B23K 31/00* (2013.01)

(58) Field of Classification Search
CPC ......... B23K 26/32; B23K 26/20; B23K 31/00
USPC ....................... 219/121.64, 121.85, 137 WM; 228/262.3, 262.4, 262.41, 262.44; 419/13; 148/212
See application file for complete search history.

(56) References Cited

U.S. PATENT DOCUMENTS 4,670,065 A * 6/1987 Yasuda et al. .................. 148/651
4,947,463 A * 8/1990 Matsuda et al. .......... 219/121.85
(Continued)

OTHER PUBLICATIONS

Wang et al., "'In-situ' weld-alloying/laser beam welding of SiCp/6061Al MMC", Materials Science and Engineering A, Nov. 30, 2000, pp. 1-6, vol. 293, Issues 1-2, Elsevier Science S.A.
(Continued)

*Primary Examiner* — Samuel M Heinrich
(74) *Attorney, Agent, or Firm* — The Law Office of Michael E. Kondoudis

(57) ABSTRACT

A process is provided for laser beam welding of surface treated steel components. Two steel components, at least one of which is a surface treated steel component, are relatively arranged to form a joint that is to be welded. Using a laser beam, the two steel components are irradiated along the joint so as to heat materials within each of the two steel components to a welding temperature, and thereby form a weld pool. During welding a metallic constituent is introduced into a leading edge of the weld pool, in front of the laser beam along a welding direction. The introduced metallic constituent combines with a species, which is released into the weld pool from the surface treated steel component, to form a compound that is stable within the weld pool at the welding temperature.

19 Claims, 3 Drawing Sheets

(51) Int. Cl.
  *B23K 31/00*  (2006.01)
  *B23K 26/28*  (2014.01)

(56) References Cited

U.S. PATENT DOCUMENTS

| | | |
|---|---|---|
| 5,446,257 A | 8/1995 | Sakamoto et al. |
| 5,618,452 A | 4/1997 | Matubara et al. |
| 5,831,239 A | 11/1998 | Matubara et al. |
| 6,596,962 B2 | 7/2003 | Haschke |
| 6,683,268 B2 | 1/2004 | Briand et al. |
| 6,727,459 B1 | 4/2004 | Bialach |
| 6,744,007 B2 | 6/2004 | Ono et al. |
| 6,770,840 B2 | 8/2004 | Minamida et al. |
| 7,241,971 B2* | 7/2007 | Bonnet ............... 219/137 WM |
| 7,288,737 B2 | 10/2007 | Briand |
| 7,408,130 B2 | 8/2008 | Sonoda et al. |
| 2004/0031544 A1* | 2/2004 | Hara et al. ............... 148/521 |
| 2015/0017052 A1* | 1/2015 | Matic ............... 419/8 |

OTHER PUBLICATIONS

Gu et al., "Laser Beam Welding of Nitride Steel Components", Physics Procedia, Apr. 15, 2011 (online publication date), pp. 40-45, vol. 12, Part A, Elsevier Ltd.

International Search Report dated Mar. 27, 2012 in corresponding International Application No. PCT/CA2011/001390.

* cited by examiner

LASER BEAM WELDING

This application claims the benefit under 35 U.S.C. 119(e) of U.S. Provisional Patent Application No. 61/424,327, which was filed on Dec. 17, 2010, the entire contents of which are incorporated herein by reference.

FIELD OF THE INVENTION

The instant invention relates generally to laser beam welding, and more particularly to laser beam welding of surface treated metal components, such as for instance nitride steels, using a metal-cored filler wire containing alloying constituents.

BACKGROUND OF THE INVENTION

Laser beam welding is a joining technique that offers a number of advantages over conventional gas metal arc welding (GMAW), such as for instance low heat input, short cycle time and good cosmetic welds. The process is frequently used in high volume applications, such as for instance the welding together of powertrain components in the automotive industry. In this way, components that contain multiple grades or multiple types of material can be manufactured at relatively low production cost. By way of a specific and non-limiting example, a flexplate contains a ring gear that is welded to an outer rim of a thin disc of stamped steel. The main function of the flexplate in an automobile is to connect the transmission's torque converter to the engine's crankshaft. A flexplate is used instead of a solid, non-flexing disc because the torque converter's outer metal shell tends to expand with heat under continuous operation and its flexing feature prevents it from cracking and failing prematurely. The ring gear is typically treated by carbonization to increase the hardness and wear-resistance of its teeth, while the stamped disc, usually large in diameter, is made of low carbon steel. In order to enhance the wear-resistance on the surface, nitriding of the surface of the disc is typically required by original equipment manufacturers (OEMs).

Unfortunately, laser beam welding of nitride steel components typically produces low strength welds that are also highly porous. These characteristics make laser welds generally unsatisfactory for powertrain applications that involve the joining together of nitrided components. The difficulty lies in the fact that laser beam welding is a deep penetration welding process, and that the nitride layer extends deep inside the weld joint. When the nitride layer is melted inside the joint during laser beam welding, nitrogen is released into and is retained within the resulting weld pool. Subsequently, the nitrogen gas coalesces to form bubbles as the weld pool solidifies. Since laser beam welding is a fast process there is insufficient time for the nitrogen bubbles to escape out of the weld pool under normal welding conditions, and as a result the bubbles of nitrogen gas become occluded in the weld material, thereby increasing porosity and reducing the strength of the resulting laser weld.

Past attempts to improve the quality of laser welds in nitrided components have focused on optimizing the welding parameters and modifying the characteristics of the laser beam. Overall, these attempts have failed to achieve satisfactory results. Currently, the only process that is known to produce satisfactory laser welds in nitrided components requires the removal of the nitride layer along the joint prior to performing laser beam welding. However, such an approach is not a practical solution for high production-volume applications.

It would therefore be beneficial to provide a method for laser beam welding of nitride steel components that overcomes at least some of the above-mentioned limitations and disadvantages of the prior art.

SUMMARY OF THE INVENTION

According to an aspect of at least one embodiment of the instant invention, a process is disclosed for the joining together of two or more components by laser beam welding. The disclosed process at least partially overcomes some of the disadvantages that are associated with the prior art processes. For instance, laser beam welds that are formed between components that have undergone certain types of surface treatments are known to be porous and of generally unacceptable quality. This porosity of the laser beam weld is attributed to the decomposition of the nitride layer within the joint between the components at elevated—but below welding—temperatures, which leads to bubbles of nitrogen gas becoming trapped in the weld. The process that is disclosed in this document uses a filler wire with a core that contains a specially formulated metallic composite, including an element such as for instance titanium, which combines with the nitrogen that is liberated during the decomposition of the nitride layer in the joint to produce a compound, such as for instance titanium nitride, that remains stable even at elevated temperatures significantly higher than welding temperature. For instance, titanium nitride has a melting temperature that is higher than the welding temperature, i.e. the melting temperature of the steel or the respective metal components to be welded. In this way a compound is formed in the joint via a reaction between the filler wire (or more particularly the metal composite within the core of the filler wire) and a decomposition product of the nitride coating, or an impurity on the surface of the metal components that are to be welded together, the compound being one that remains chemically stable at the welding temperature.

In accordance with an aspect of the instant invention, the composition of the filler wire is formulated for a specific application. In principle, a wide variety of formulations of metal composite can be achieved. Therefore, this type of filler wire can be used to optimize welding to various metal joints, producing metallurgically sound welds that are substantially free from defects such as voids and pores.

In a specific application, the process according to an aspect of the instant invention is applied to forming a flex plate by welding together a stamped disc and a ring gear using metal-cored filler wire to suppress the formation of bubbles in the weld. In this specific application of the process, the metal-cored filler wire has a stainless steel sheathe that is filled with metal composite that is rich in titanium, and the surface of the stamped disc has undergone gas nitriding.

According to an aspect of another embodiment of the instant invention, provided is a process for laser beam welding of nitride steel components, comprising: relatively arranging two steel components to form a joint that is to be welded, at least one of the two steel components being a nitride steel component; and forming a weld along the joint so as to join together the two steel components, comprising: advancing a laser beam irradiation position along the joint in a welding direction, the laser beam irradiating the two steel components at the irradiation position and forming within the joint a weld pool containing molten steel from the two steel components heated to a welding temperature; and advancing a filler wire along the joint in the welding direction, the filler wire having a core comprising a metallic composite that contains titanium, the filler wire preceding the laser beam irradiation position in the welding direction and being spaced away from the laser beam by a distance that is sufficiently small such that a tip portion of the filler wire is introduced directly into the weld pool in front of the laser beam along the welding direction, wherein melted material from the tip portion of the filler wire mixes into the weld pool and the titanium that is present in said melted material combines with nitrogen from the nitride steel component and forms titanium nitride inside the weld pool at the welding temperature.

According to an aspect of another embodiment of the instant invention, provided is a process for laser beam welding of nitride steel components, comprising: relatively arranging two steel components to form a joint that is to be welded, at least one of the two steel components being a nitride steel component; using a laser beam, irradiating the two steel components along the joint so as to heat material within each of the two steel components to a welding temperature and thereby form a weld pool in the joint; and introducing titanium into a leading edge of the weld pool, the leading edge of the weld pool being in front of the laser beam along a welding direction, wherein the introduced titanium combines with nitrogen that is released into the weld pool from the nitride steel component to form titanium nitride within the weld pool at the welding temperature.

According to an aspect of another embodiment of the instant invention, provided is a process for laser beam welding of surface treated steel components, comprising: relatively arranging two steel components to form a joint that is to be welded, at least one of the two steel components being a surface treated steel component; and forming a weld along the joint so as to join together the two steel components, comprising: advancing a laser beam irradiation position along the joint in a welding direction, the laser beam irradiating the two steel components at the irradiation position and forming within the joint a weld pool containing molten steel from the two steel components heated to a welding temperature; and advancing a filler wire along the joint in the welding direction, the filler wire having a core comprising a metallic composite including a constituent that is selected to form a compound with a species that is released into the weld pool from the surface treated steel component, the filler wire preceding the laser beam irradiation position in the welding direction and being spaced away from the laser beam by a distance that is sufficiently small such that a tip portion of the filler wire is heated above a melting temperature thereof during the forming of the weld pool, wherein melted material from the tip portion of the filler wire mixes into the weld pool and the constituent that is present in said melted material combines with the species that is released from the surface treated steel component to form the compound inside the weld pool at the welding temperature.

According to an aspect of another embodiment of the instant invention, provided is a process for laser beam welding of surface treated steel components, comprising: relatively arranging two steel components to form a joint that is to be welded, at least one of the two steel components being a surface treated steel component; using a laser beam, irradiating the two steel components along the joint so as to heat material within each of the two steel components to a welding temperature and thereby form a weld pool; and introducing a metallic constituent into a leading edge of the weld pool, the leading edge of the weld pool being in front of the laser beam along a welding direction, wherein the introduced metallic constituent combines with a species that is released into the weld pool from the surface treated steel component to form a compound that is stable within the weld pool at the welding temperature.

BRIEF DESCRIPTION OF THE DRAWINGS

The instant invention will now be described by way of example only, and with reference to the attached drawings, wherein similar reference numerals denote similar elements throughout the several views, and in which.

DETAILED DESCRIPTION OF THE INVENTION

The following description is presented to enable a person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the scope of the invention. Thus, the present invention is not intended to be limited to the embodiments disclosed, but is to be accorded the widest scope consistent with the principles and features disclosed herein.

Figure 1:
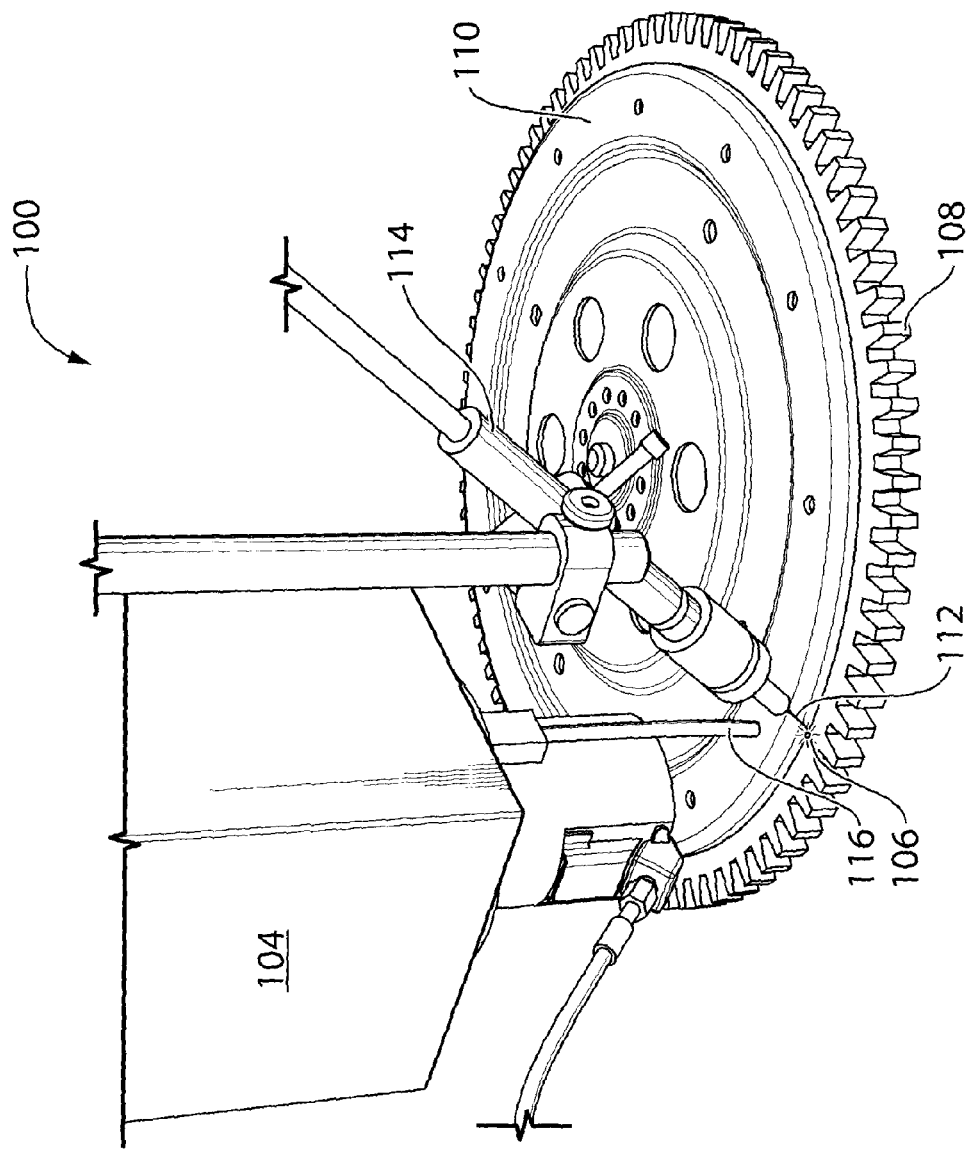
FIG. 1 is a simplified perspective view of a laser welding system, which is suitable for implementing a process according to an embodiment of the instant invention.

Referring to FIG. 1, shown is a simplified perspective view of a laser welding system, which is suitable for implementing a process according to an embodiment of the instant invention. In particular, the system of FIG. 1 is suitable for laser welding nitride steel components as well as other types of surface treated metal components. The system that is shown generally at 100 comprises a laser source (not shown), such as for instance a disk laser. By way of a specific and non-limiting example, the laser source is a Trumpf model TruDisk 4002 laser, having a maximum output power of 4 kW at a wavelength of 1030 nm. The laser beam is delivered using an optical fiber of core diameter of 600 µm (not shown), and is focused on the workpiece surface using a suitable laser welding head 104, such as for instance a Trumpf D70 laser welding head. In this example, both the collimating lens and the focusing lens of the welding head 104 have a focal length of 200 mm. Hence the size of the beam spot 106 at focus is 0.6 mm in diameter. Optionally, another suitable laser source and/or another suitable welding head is used in place of the specific examples that have been discussed above.

In the system 100 that is shown in FIG. 1, the welding head 104 is mounted on the end effecter of a not illustrated robot, such as for instance an ABB model IRB4400 robot. For instance, the robot is programmed to move the welding head 104 to perform the welding between a ring gear 108 and a thin disc of stamped steel 110 so as to form a flexplate. As is discussed above, the ring gear 108 is typically treated by carbonization to increase the hardness and wear-resistance of its teeth, while the stamped disc 110 is made of low carbon steel and is nitrided. In the instant example, the stamped disc 110 is gas nitrided with a tumble polish, the diffusion thickness of the nitrogen is 0.45 mm at a minimum, and the compound layer thickness is ≥0.015 mm. The surface of the stamped disc 110 with the nitride layer is one of the butting surfaces in the joint that is being laser welded.

Referring still to FIG. 1, a metal-cored filler wire 112 is fed using a wire-feeding device 114 such that a tip portion of the filler wire 112, which is also commonly referred to as a fillet wire, is positioned proximate to the beam spot 106. The wire-feeding device 114 is mounted on the welding head 104 so that the position of the wire-feeding device 114 relative to the welding head 104 is fixed. Shielding gas is provided via a shielding gas nozzle 116 in a known fashion, in order to protect the weld area from oxidation.

Figure 2:
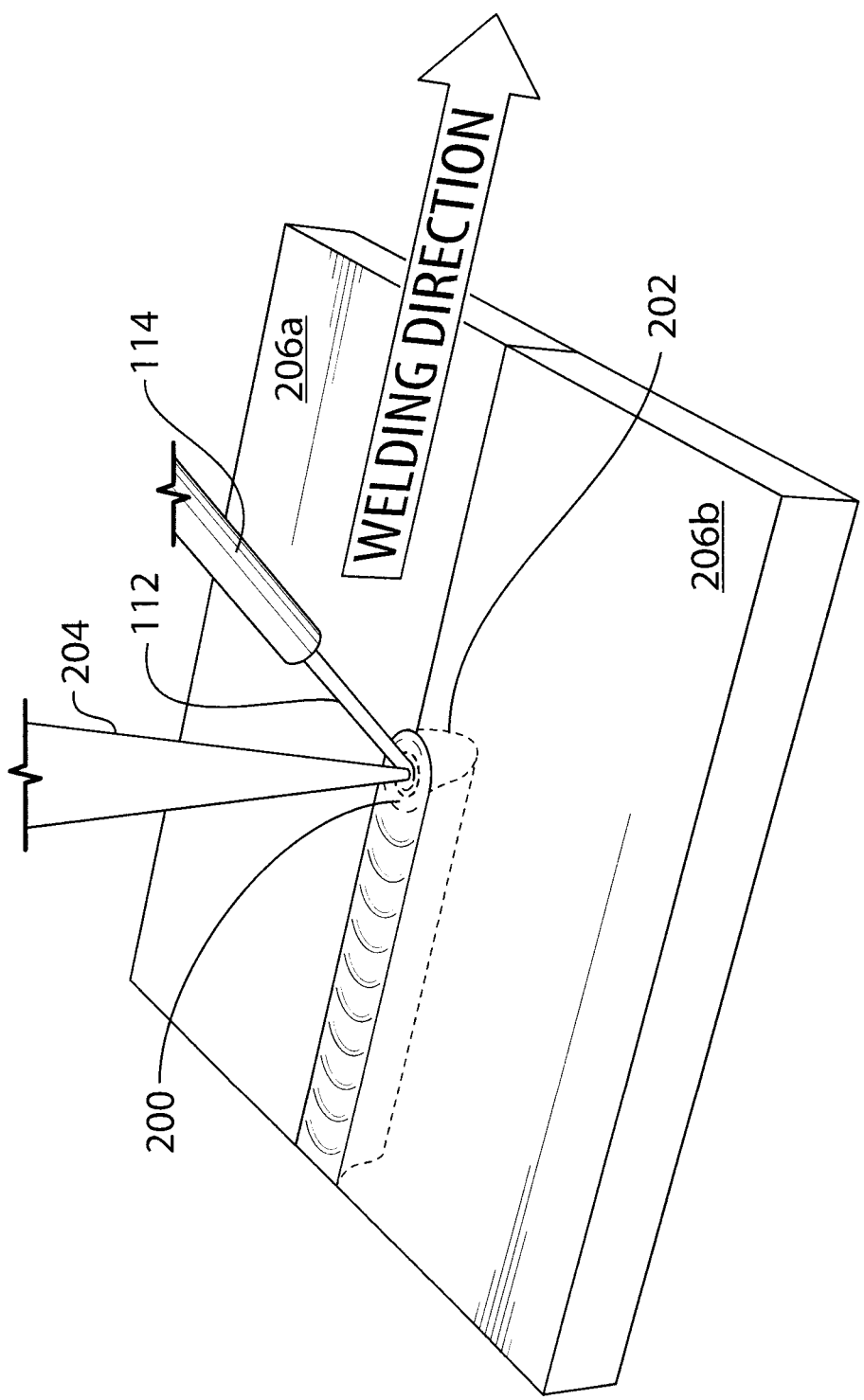
FIG. 2 is a diagrammatic isometric view showing a laser welding process according to an embodiment of the instant invention.

Referring now to FIG. 2, shown is a diagrammatic isometric view of a laser welding process according to an embodiment of the instant invention. During the laser welding process, the filler wire 112 is fed into the weld pool 200 at a location that is in front of the laser beam 204 in the welding direction, such that melted filler wire material 202 mixes efficiently with the melt material in the joint between the components that are being welded. The heat that is produced when the laser beam 204 irradiates the surface of the work pieces 206a and 206b and forms the weld pool 200 is sufficient to cause the filler wire 116 to melt, such that the tip portion of the filler wire 112 is deposited directly into the leading edge of the weld pool 200. By way of a specific and non-limiting example, the filler wire has a stainless steel sheath and a metal core containing titanium. A suitable, commercially available filler wire (from Select Arc Inc.) has a metal core containing by weight %: C 0.03, Mn 0.60, P 0.01, S 0.01, Si 0.69, Cr 11.90, Ti 1.00.

Without wishing to be held to any particular theory, the following is thought to apply. The materials of the two components that are being welded together, in this example the ring gear 108 and stamped disc 110, melt under the influence of the laser beam 204 as the laser beam 204 moves along the weld direction, thereby forming a moving weld pool 200. It is believed that the nitride layer of the stamped disc 110 decomposes at the elevated temperature within the weld pool 200, releasing nitrogen that subsequently reacts with the titanium that is introduced from the metal-cored filler wire 112, thereby forming titanium nitride. Titanium nitride has a very high melting point (2950° C.) and is chemically stable under the conditions that exist within the weld pool 200. Thus, as the laser beam 204 advances along the welding direction the nitrogen remains bound to the titanium and does not form bubbles as the weld pool 200 cools and eventually solidifies.

Figure 4:
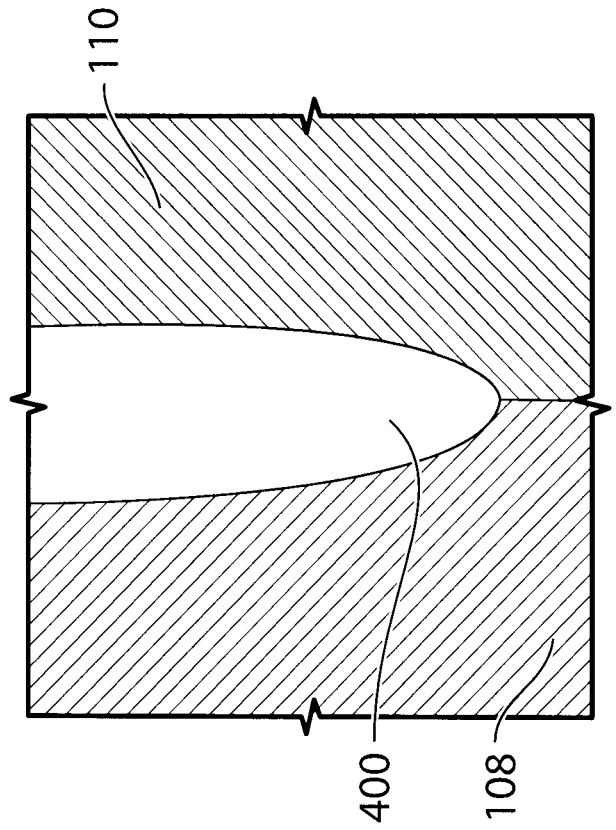
FIG. 4 is a diagrammatic view illustrating a cross-sectional profile of a laser weld between nitride steel components, formed using a process according to an embodiment of the instant invention.
Figure 3:
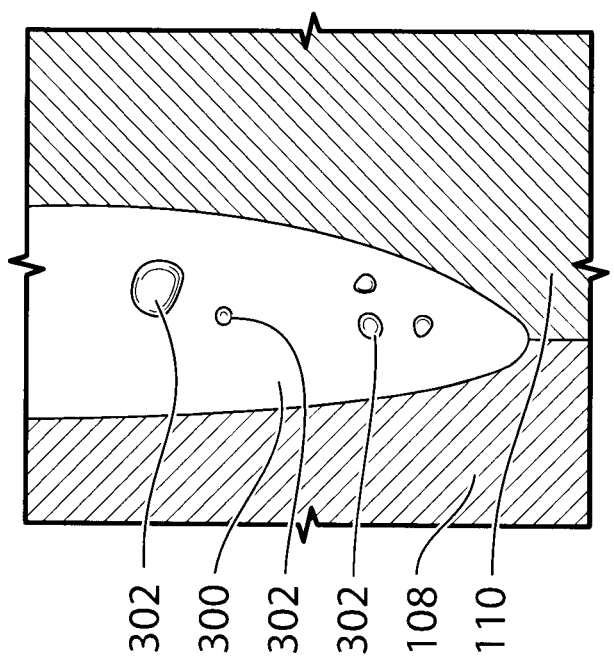
FIG. 3 is a diagrammatic view illustrating a cross-sectional profile of a laser weld between nitride steel components, formed using a prior art process.

FIGS. 3 and 4 compare the laser welds that are formed between nitride steel components using the prior art process (FIG. 3) and the process according to an embodiment of the instant invention (FIG. 4). As is shown in FIG. 3, the weld 300 that is formed between the ring gear 108 and the stamped disc 110 contains large voids or pores 302, which correspond to occluded nitrogen gas bubbles that became trapped during the rapid cooling of the weld pool 200. In particular, these large voids or pores 302 are present throughout the laser weld that is formed using the prior art process without filler wire. Although the weld 300 is cosmetically acceptable, the presence of the voids or pores 302 makes the weld unacceptable structurally. On the other hand, the weld 400 that is illustrated in FIG. 4 exhibits reduced porosity compared to the weld that is illustrated in FIG. 3. In fact, the main body of the weld 400 does not contain any large voids or pores. Only near the root of the weld 400 are small voids discernable, which are believed to occur due to the inability of the material from the filler wire 112 to mix with the molten material from the workpieces at the bottom of the weld 400. That being said, the presence of small voids near the root of the weld 400 does not adversely affect the strength of the weld 400. For instance, in a destructive test of a finished flexplate having 8-segment welds distributed equally along the joining interface, the part was able to hold more than 37,000 lb force before breaking the welds. To put this in perspective, the rated specification for the push test of the part is 10,000 lb.

The alloying constituents of the metal-cored filler wire 112 can be formulated for joining together steel components with specific coatings. In this way, the titanium in the metal-cored filler wire 112 can be used for joining together steel components with a nitride coating as has been discussed above by way of a specific and non-limiting example. Optionally, the titanium is replaced by aluminum in the metal-cored filler wire 112 in order to solve the nitrogen issue associated with laser welding, since aluminum nitride (AlN) also has a high decomposition temperature and melting point and is a stable compound in the weld pool. Further optionally, zinc may be provided in the metal-cored filler wire for use in laser beam welding of aluminum-coated steel, such as for instance Usibor® steel. The aluminum has a low melting point and it has a rapid interaction with liquid Zn. In the weld pool, the aluminum and zinc form a liquid compound that has a very high vaporizing temperature (about 2450° C.), thereby preventing or reducing the formation of brittle compounds of aluminum and iron. Of course, other variations may also be envisaged.

While the above description constitutes a plurality of embodiments of the present invention, it will be appreciated that the present invention is susceptible to further modification and change without departing from the fair meaning of the accompanying claims.

What is claimed is:

1. A process for laser beam welding of nitride steel components, comprising:
   relatively arranging two steel components to form a joint that is to be welded, at least one of the two steel components being a nitride steel component; and
   forming a weld along the joint so as to join together the two steel components, comprising:
      advancing a laser beam irradiation position along the joint in a welding direction, the laser beam irradiating the two steel components at the irradiation position and forming within the joint a weld pool containing molten steel from the two steel components heated to a welding temperature; and
      advancing a filler wire along the joint in the welding direction, the filler wire having a core comprising a metallic composite that contains titanium, the filler wire preceding the laser beam irradiation position in the welding direction and being spaced away from the laser beam by a distance that is sufficiently small such that a tip portion of the filler wire is introduced directly into the weld pool in front of the laser beam along the welding direction,
   wherein melted material from the tip portion of the filler wire mixes into the weld pool and the titanium that is present in said melted material combines with nitrogen from the nitride steel component and forms titanium nitride inside the weld pool at the welding temperature.

2. The process of claim 1 wherein the filler wire is a metal-cored filler wire having a stainless steel sheath surrounding and containing the metallic composite.

3. The process of claim 1 wherein the two steel components comprise a stamped steel disc having a nitride surface layer and a ring gear other than having a nitride surface layer.

4. A process for laser beam welding of nitride steel components, comprising:

relatively arranging two steel components to form a joint that is to be welded, at least one of the two steel components being a nitride steel component;

using a laser beam, irradiating the two steel components along the joint so as to heat material within each of the two steel components to a welding temperature and thereby form a weld pool in the joint; and introducing titanium into a leading edge of the weld pool, the leading edge of the weld pool being in front of the laser beam along a welding direction, wherein the introduced titanium combines with nitrogen that is released into the weld pool from the nitride steel component to form titanium nitride within the weld pool at the welding temperature.

5. The process of claim 4 wherein introducing the titanium into the leading edge of the weld pool comprises providing a metal-cored filler wire, having a stainless steel sheath surrounding a metallic core containing the titanium, adjacent to the laser beam and in front of the laser beam along the welding direction.

6. The process of claim 5 wherein heat that is generated as a result of the laser beam irradiating the two steel components melts a tip portion of the metal-cored filler wire, and the titanium that is contained within the melted tip portion is introduced into the leading edge of the weld pool.

7. The process of claim 6 wherein the metal-cored filler wire and the laser beam are both advanced along the welding direction during the welding of the joint, the spacing between the metal-cored filler wire and the laser beam being substantially fixed.

8. A process for laser beam welding of surface treated steel components, comprising:

relatively arranging two steel components to form a joint that is to be welded, at least one of the two steel components being a surface treated steel component; and forming a weld along the joint so as to join together the two steel components, comprising:

advancing a laser beam irradiation position along the joint in a welding direction, the laser beam irradiating the two steel components at the irradiation position and forming within the joint a weld pool containing molten steel from the two steel components heated to a welding temperature; and advancing a filler wire along the joint in the welding direction, the filler wire having a core comprising a metallic composite including a constituent that is selected to form a compound with a species that is released into the weld pool from the surface treated steel component, the filler wire preceding the laser beam irradiation position in the welding direction and being spaced away from the laser beam by a distance that is sufficiently small such that a tip portion of the filler wire is heated above a melting temperature thereof during the forming of the weld pool, wherein melted material from the tip portion of the filler wire mixes into the weld pool and the constituent that is present in said melted material combines with the species that is released from the surface treated steel component to form the compound inside the weld pool at the welding temperature.

9. The process of claim 8 wherein the filler wire is a metal-cored filler wire having a stainless steel sheath surrounding and containing the metallic composite.

10. The process of claim 9 wherein the surface treated steel component comprises a nitride layer, and wherein the metallic composite includes titanium.

11. The process of claim 10 wherein the two steel components comprise a stamped steel disc having a nitride surface layer and a ring gear other than having a nitride surface layer.

12. The process of claim 9 wherein the surface treated component comprises a surface coating containing aluminum, and wherein the metallic composite includes zinc.

13. A process for laser beam welding of surface treated steel components, comprising:

relatively arranging two steel components to form a joint that is to be welded, at least one of the two steel components being a surface treated steel component;

using a laser beam, irradiating the two steel components along the joint so as to heat material within each of the two steel components to a welding temperature and thereby form a weld pool; and introducing a metallic constituent into a leading edge of the weld pool, the leading edge of the weld pool being in front of the laser beam along a welding direction, wherein the introduced metallic constituent combines with a species that is released into the weld pool from the surface treated steel component to form a compound that is stable within the weld pool at the welding temperature.

14. The process of claim 13 wherein introducing the metallic constituent into the leading edge of the weld pool comprises providing a metal-cored filler wire, having a stainless steel sheath surrounding a metallic core containing the metallic constituent, adjacent to the laser beam and in front of the laser beam along the welding direction.

15. The process of claim 14 wherein heat that is generated as a result of the laser beam irradiating the two steel components melts a tip portion of the metal-cored filler wire, and the metallic constituent that is contained within the melted tip portion is introduced into the leading edge of the weld pool.

16. The process of claim 14 wherein the metal-cored filler wire and the laser beam are both advanced along the welding direction during the welding of the joint, the spacing between the metal-cored filler wire and the laser beam being substantially fixed.

17. The process of claim 13 wherein the surface treated steel component comprises a nitride layer, and wherein the metallic constituent is titanium.

18. The process of claim 17 wherein the two steel components comprise a stamped steel disc having a nitride surface layer and a ring gear other than having a nitride surface layer.

19. The process of claim 13 wherein the surface treated component comprises a surface coating containing aluminum, and wherein the metallic composite is zinc.

* * * * *